United States Patent [19]

Wohlford et al.

[11] 4,449,758
[45] May 22, 1984

[54] SPROCKET RECEPTACLE CLEANER EMBODIED IN A TRACK SECTION

[75] Inventors: William P. Wohlford, Bettendorf, Iowa; Howard V. Beitel, Moline, Ill.

[73] Assignee: Deere & Company, Moline, Ill.

[21] Appl. No.: 344,670

[22] Filed: Feb. 1, 1982

[51] Int. Cl.³ ................... B62D 55/20; B62D 55/24
[52] U.S. Cl. ................................ 305/12; 198/497; 305/57
[58] Field of Search ............ 305/11, 12, 36, 39, 305/53, 54, 57, 58 R; 198/497, 850–853; 474/901

[56] References Cited

U.S. PATENT DOCUMENTS

| | | | |
|---|---|---|---|
| 2,823,080 | 2/1958 | Bauer, Jr. | 305/10 |
| 3,563,614 | 2/1971 | Parks | 305/57 X |
| 3,567,294 | 3/1971 | Simpson et al. | 305/57 |
| 3,948,573 | 4/1976 | Baylor | 305/57 |
| 4,150,858 | 4/1979 | Fox et al. | 305/57 |
| 4,176,887 | 12/1979 | Alpers et al. | 305/57 |

Primary Examiner—David A. Scherbel

[57] ABSTRACT

Disclosed are two types of track sections respectively having link assemblies interconnected by pivot joints and by resilient flexors. In both types of track sections a sprocket-engaging portion is provided for being engaged by teeth of a track drive sprocket, and a receptacle-cleaning portion is provided for entering receptacles defined by adjacent ones of the sprocket teeth and includes beveled or wedge-shaped ribs for forcing material from the receptacles. The sprocket-engaging portions of adjacent track sections are spaced apart by a distance at least approximating twice the pitch of the sprocket whereby an unused receptacle exists between each adjacent pair of sprocket-engaging portions which is meshed with the sprocket, and the receptacle-cleaning portions are located so as to enter the unused receptacles.

7 Claims, 7 Drawing Figures

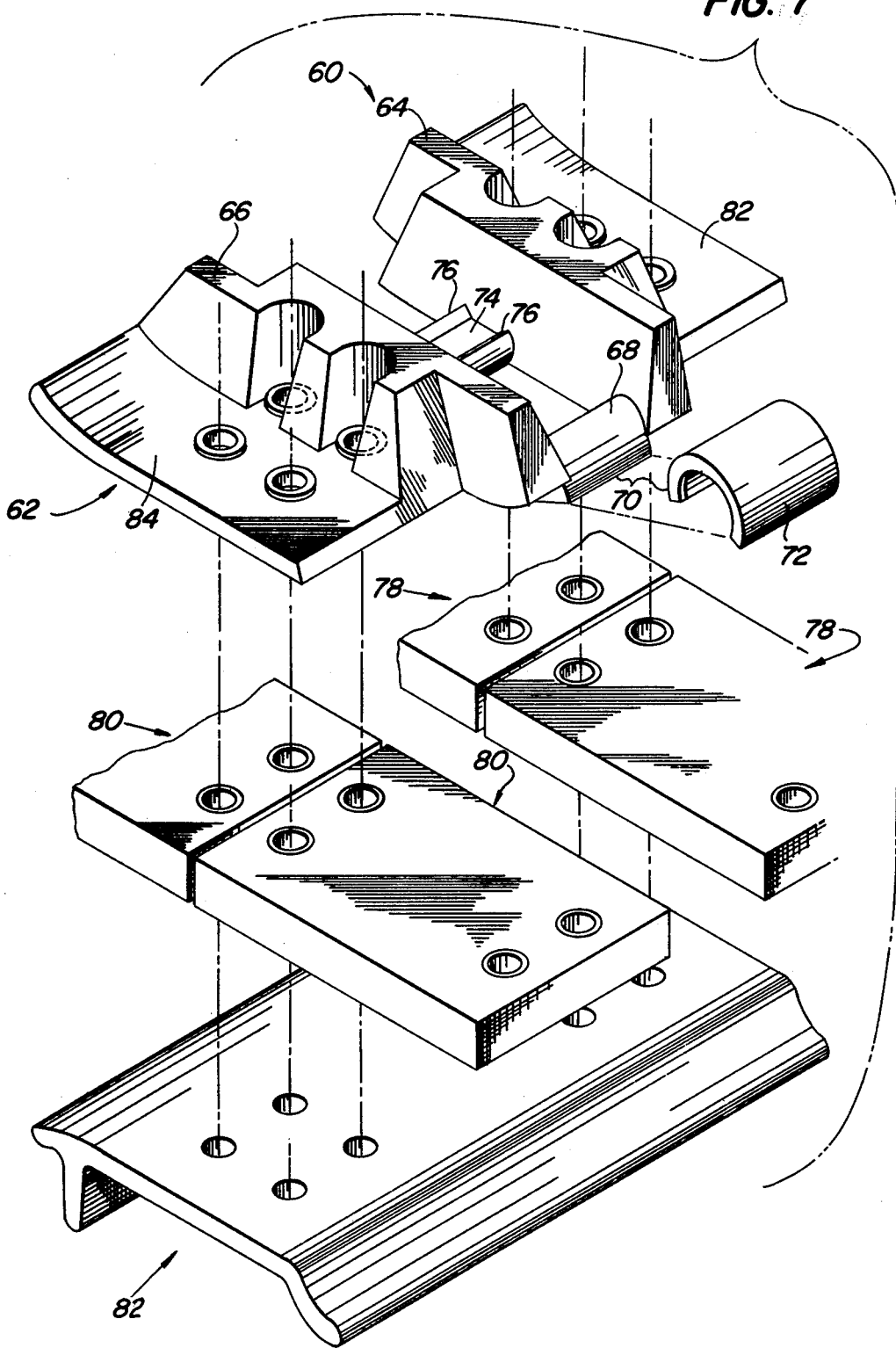

SPROCKET RECEPTACLE CLEANER EMBODIED IN A TRACK SECTION

BACKGROUND OF THE INVENTION

The present invention relates to track sections for forming tracks for track-laying vehicles and more specifically relates to link assemblies of such sections.

It is well known that during operation of a track-laying vehicle in packable material such as damp soil or snow and the like that such material will become packed rock hard within the receptacles formed by adjacent teeth of the track drive sprockets and will become built-up to the extent that the pitch relationship between the sprocket at the track is effectively altered such that the track no longer meshes properly with the sprocket and results in accelerated wear to both the track and the sprocket.

Heretofore, one popular way of trying to eliminate or reduce packing has been to provide relief notches in the sprocket receptacles. This approach has not been especially effective and, in addition, results in there being less bearing surface between the sprocket-engaging portions of the track sections and the sprocket and thus results in an increase in surface unit loading and, consequently, in wear.

The present invention seeks to eliminate the packing problem experienced by previous designs by taking advantage of the conventional practice of using double-pitch track together with drive sprockets having odd numbers of teeth.

SUMMARY OF THE INVENTION

According to the present invention, there is provided an improved track section for forming part of an endless drive track.

An object of the invention is to provide a track section constructed for effftectively cooperating with a drive sprocket so as to eliminate the packing of material in the receptacles formed by adjacent teeth of the sprocket. More specifically, it is an object of the invention to provide a track section including sprocket-engaging and receptacle-cleaning portions spaced from each other by a distance substantially equal to the pitch of a sprocket with which the track section is intended to be used so that the sprocket-engaging and receptacle-cleaning portions will move into adjacent sprocket receptacles during engagement of the track section with such a sprocket.

Yet another object is to provide receptacle-cleaning portions, as set forth above, which include beveled ribs or chisel-shaped surfaces which move closely adjacent the root diameter of a sprocket engaged by the track section so as to engage and force out any material residing in the sprocket receptacles entered by the receptacle-cleaning portions.

Still another object of the invention is to provide cleaning portions which are adapted to form part of track sections that are intended to be pivotally joined to adjacent track sections or alternatively with track sections which include resilient flexors that are intended to interconnect adjacent track sections.

These and other objects will become apparent from a reading of the ensuing description together with the appended drawings.

BRIEF DESCRIPTION OF THE DRAWINGS

FIG. 7 is an exploded view showing a second track section embodiment.

DESCRIPTION OF THE PREFERRED EMBODIMENT

Figure 1:
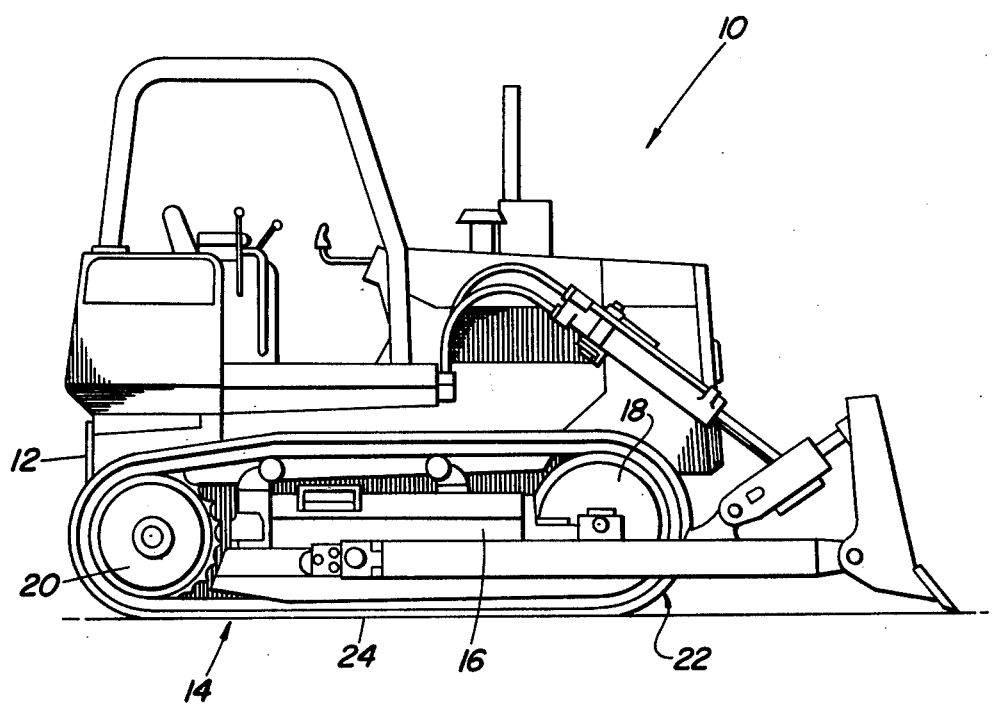
FIG. 1 is a right side view of a crawler tractor having a drive track embodying the present invention.

Referring now to FIG. 1, therein is shown a crawler tractor 10, which typifies the type of vehicles with which the present invention is particularly suited for use. The tractor 10 includes a main frame 12 supported on track assemblies 14 (only one shown) extending longitudinally at opposite sides thereof. Each track assembly 14 includes a track frame 16 having an idler wheel 18 slidably supported at the forward end thereof. Supported from the frame 12 and disposed in fore-and-aft alignment with the idler wheel 18 is a drive sprocket 20. An endless drive track 22 is trained about the idler wheel 18 and drive sprocket 20. The track 22 includes a lower run 24 which is in ground contact, and it is to be noted that hereinafter the description of various components of the track is made with reference to their being positioned as they would be if located in the lower run 24.

Figure 2:
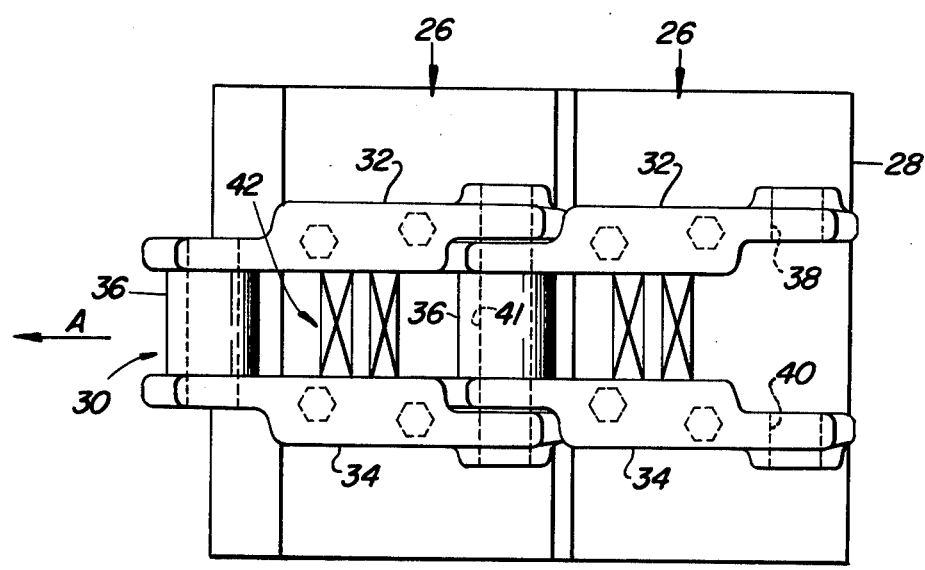
FIG. 2 is a top plan view of a pair of track sections as they would appear when located in a lower run of a drive track.
Figure 3:
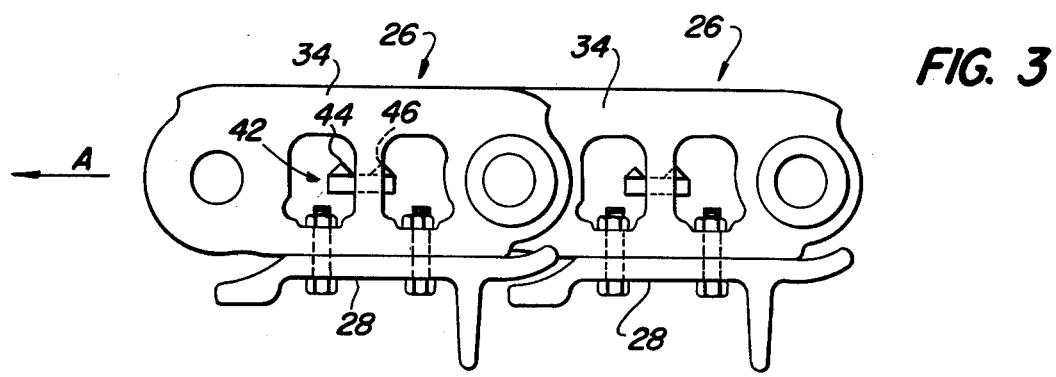
FIG. 3 is a side view of the track sections shown in FIG. 2.
Figure 4:
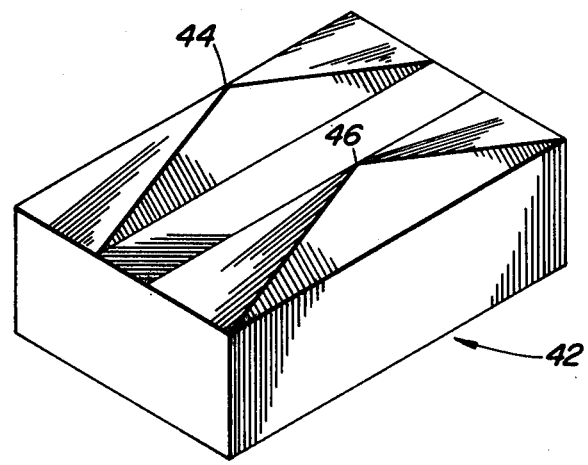
FIG. 4 is a perspective view of the receptacle-cleaning portion.

Referring now to FIGS. 2-4, therein is shown a pair of track sections 26 which each includes a grouser 28 releasably secured to a link assembly 30. Each link assembly 30, as considered relative to a forward direction of travel indicated by the arrow A, includes laterally spaced, right- and left-hand link portions 32 and 34, respectively. The forward ends of the link portions 32 and 34 are each provided with a transverse bore. The bores are axially aligned and press fit therein is a sprocket-engaging portion 36 in the form of a cylindrical bushing. Alternatively, the portion 36 could be made as an integral part with the link portions 32 and 34. The rearward ends of the link portions 32 and 34 are respectively provided with pin bores 38 and 40 which are in axial alignment with each other and are adapted to have a track pin 41 pressed therein after a sprocket-engaging portion 36 of an adjacent track link assembly has been aligned therewith. The link portions 32 and 34 are formed integrally with a transverse sprocket receptacle-cleaner portion 42 which joins the link portions 32 and 34 at respective locations spaced midway between respective central axes of the sprocket-engaging portion 36 and the pin bores 38 and 40. The upper surface of the receptacle-cleaner portion 42 defines a pair of fore-and-aft beveled transverse ribs 44 and 46, respectively beveled so as to taper to a point.

Figure 5:
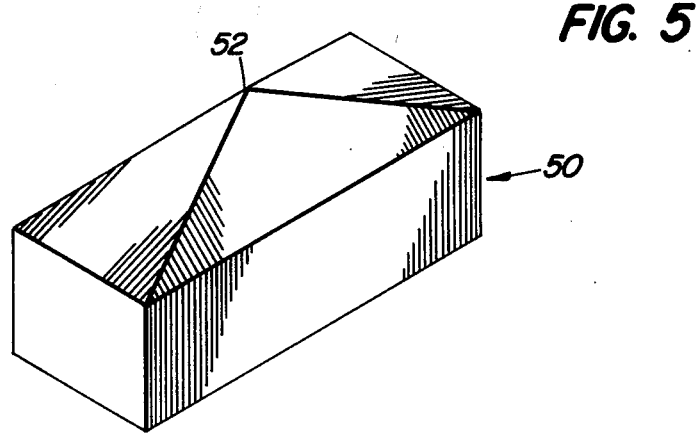
FIG. 5 is a perspective view similar to FIG. 4 but showing an alternate receptacle-cleaner portion configuration.

As it can be seen in FIG. 5, an alternate receptacle-cleaner portion 50 having only a single chisel-shaped rib 52 may be used if desired.

Figure 6:
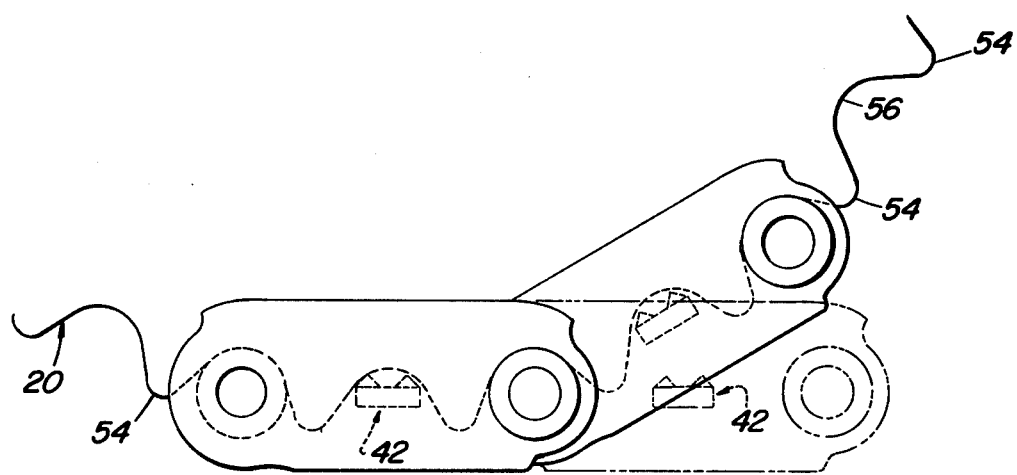
FIG. 6 is a schematic side view showing a drive track segment being engaged by a drive sprocket and illustrating the receptacle-cleaning action of the receptacle-cleaning portion.

Referring now to FIG. 6, the drive sprocket 20 is shown as including a plurality of teeth 54. Adjacent ones of the teeth 54 cooperate to define receptacles 56 for receiving the sprocket-engaging portion 36 of each of the link assemblies 30. As the track 22 moves about the sprocket 20, successive link assemblies move into engagement with the sprocket and, as they do, their sprocket-engaging portions 36 pivot into engagement with a first receptacle 56 and then their receptacle-cleaning portions 42 swing into and engage and force out any material present in the next adjacent receptacle. Preferably, the sprocket 20 has an odd number of teeth as is conventional practice, so that with each revolution thereof the sprocket-engaging portions 36 and hence the receptacle-cleaning portions 42 will index to the next adjacent receptacle. In this way, each receptacle is cleaned during every two revolutions of the sprocket.

Referring now to FIG. 7, therein is shown an application of sprocket-cleaning portions to a track section which employs a flexor for permitting flexure between sections rather than by the pin and bushing pivot connections, as first described. Specifically, there is shown a track section 60 including a link assembly 62 including right- and left-hand link portions 64 and 66 interconnected at their respective forward ends by a base portion 68 of a sprocket-engaging portion 70 including a wear portion 72 releasably received on the base portion. Joining the link portions 64 and 66 at respective locations spaced from the sprocket-engaging portion by a distance approximately equal to the pitch of a sprocket with which the track section 60 is intended for use is a receptacle-cleaning portion 74 having a pair of upwardly projecting transverse ribs 76.

The track section 60 also includes right- and left-hand resilient flexors 78 and 80 and a grouser 82. The link portions 64 and 66 respectively include generally flat-mounting portions 82 and 84, and the flexors 78 and 80 are releasably secured in sandwiched relationship between the mounting portions 78 and 80 and the grouser 76 in a manner more specifically described in copending application, Ser. No. 344,668, filed on an even date with this application and having a common assignee.

As concerns the operation of the receptacle-cleaning portion 74 of the track section 60, it is similar to that of the receptacle cleaner of the track section 26 described above; however, movement of the receptacle-cleaning portion 68 into the sprocket receptacles is accomplished through flexure of the flexors 78 and 80 rather than through pivotal movement.

We claim:

1. A track section for forming part of an endless track for a track laying vehicle, comprising: a link assembly, which, as viewed from the top as it would appear in a lower track run, includes right- and left-hand, spaced-apart rail portions; a sprocket-engaging portion interconnecting respective first ends of the rails portions and defining a cylindrically-curved, upwardly-facing surface adapted for engagement with receptacles formed between and defined at least partly by adjacent teeth of a drive sprocket; a receptacle-cleaning portion interconnecting the rail portions at respective locations located in parallel spaced relationship to the sprocket-engaging portions with the distance between the sprocket-engaging and receptacle-cleaning portions being substantially equal to the pitch of a sprocket with which the link is adapted to be used; and said receptacle-cleaning portion having at least one upwardly-projecting, beveled rib dimensioned for sweeping close to a sprocket receptacle surface as the link becomes drivingly engaged by the sprocket.

2. The track section defined in claim 1 wherein the receptacle-cleaning portion includes two upwardly-projecting, beveled ribs.

3. The track section defined in claim 2 where said two beveled ribs are each tapered along its length to define a point located halfway between the link portions.

4. The track section defined in claim 1 wherein said at least one beveled rib is tapered along its length to define a point located halfway between the link portions.

5. The track section defined in claim 1 wherein the right- and left-hand link portions and the sprocket receptacle-cleaning portion are constructed as a single unit, and said sprocket-engaging portion being in the form of a bushing releasably pressed into aligned bores provided in said respective first ends of the rail portions.

6. The track section defined in claim 1 wherein said right- and left-hand rail portions, said sprocket-engaging portion and said sprocket receptacle-cleaning portion are constructed as a one-piece member.

7. The track section defined in claim 1 wherein said sprocket-engaging portion includes a support portion and a wear portion releasably engaged with the support portion; and said right- and left-hand rail portions, said support portion and said sprocket receptacle-cleaning portion being constructed together as one piece.

* * * * *